United States Patent
Weihrauch et al.

(10) Patent No.: US 7,619,343 B2
(45) Date of Patent: Nov. 17, 2009

(54) ROTOR FOR AN ELECTRICAL MOTOR

(75) Inventors: Niels Christian Weihrauch, Flensburg (DE); Peter Scavenius Andersen, Soenderborg (DK)

(73) Assignee: Danfoss Compressors GmbH, Flensburg (DE)

( * ) Notice: Subject to any disclaimer, the term of this patent is extended or adjusted under 35 U.S.C. 154(b) by 240 days.

(21) Appl. No.: 11/312,983

(22) Filed: Dec. 19, 2005

(65) Prior Publication Data

US 2006/0131977 A1 Jun. 22, 2006

(30) Foreign Application Priority Data

Dec. 20, 2004 (DK) .............................. 2004 01957

(51) Int. Cl.
*H02K 21/12* (2006.01)
(52) U.S. Cl. ..................... 310/156.78; 310/156.81; 310/156.53; 310/211; 310/212
(58) Field of Classification Search .......... 310/156.78, 310/156.81, 156.53, 211, 212
See application file for complete search history.

(56) References Cited

U.S. PATENT DOCUMENTS

| | | | |
|---|---|---|---|
| 1,823,337 A | | 9/1931 | Sheely |
| 4,064,410 A * | | 12/1977 | Roach .......................... 310/211 |
| 4,639,627 A | | 1/1987 | Takekoshi et al. ............. 310/42 |
| 5,140,211 A | | 8/1992 | Ucida |
| 5,185,918 A * | | 2/1993 | Shafer, Jr. ..................... 29/598 |
| 5,369,325 A | | 11/1994 | Nagate et al. |
| 5,719,457 A * | | 2/1998 | Helfer ......................... 310/211 |
| 5,864,191 A | | 1/1999 | Nagate et al. |
| 6,006,418 A | | 12/1999 | Takeda et al. ................. 29/598 |
| 6,031,312 A * | | 2/2000 | Zoche et al. ................. 310/211 |
| 6,047,460 A | | 4/2000 | Nagate et al. |
| 6,552,462 B2 * | | 4/2003 | Sakai et al. ............. 310/156.78 |
| 6,700,270 B2 * | | 3/2004 | Yanashima et al. ...... 310/156.78 |
| 6,707,216 B2 * | | 3/2004 | Han et al. .................... 310/211 |
| 6,727,627 B1 * | | 4/2004 | Sasaki et al. ................. 310/211 |
| 6,727,628 B2 | | 4/2004 | Shimada et al. |
| 6,876,119 B2 * | | 4/2005 | Sasaki et al. ................. 310/211 |
| 6,891,300 B2 * | | 5/2005 | Noda et al. ............. 310/156.78 |
| 6,933,647 B2 * | | 8/2005 | Kuemmlee et al. ........... 310/211 |
| 7,019,427 B2 * | | 3/2006 | Sasaki et al. ............ 310/156.78 |
| 7,112,908 B2 * | | 9/2006 | Takita et al. ................. 310/211 |
| 7,183,686 B2 * | | 2/2007 | Sasaki et al. ............ 310/156.78 |
| 2004/0004407 A1 | | 1/2004 | Laurent et al. ............ 310/156.8 |
| 2005/0121991 A1 * | | 6/2005 | Sasaki et al. ............ 310/156.78 |
| 2006/0119205 A1 * | | 6/2006 | Sasaki et al. ............ 310/156.78 |

(Continued)

FOREIGN PATENT DOCUMENTS

DE  102 54 967 A1  6/2004

(Continued)

*Primary Examiner*—Quyen Leung
*Assistant Examiner*—Naishadh N Desai
(74) *Attorney, Agent, or Firm*—McCormick, Paulding & Huber LLP

(57) ABSTRACT

The invention provides a rotor for an electrical motor. The rotor comprises both a squirrel cage and a number of magnets and can be inserted e.g. in a line-start motor. To secure the magnets in cavities in a core of the rotor, an end plate is attached to one axial end face by rivet means, and to simplify manufacturing of the rotor, the rivet means forms part of at least one of the short circuit rings of the squirrel cage.

8 Claims, 3 Drawing Sheets

U.S. PATENT DOCUMENTS

2006/0131980 A1  6/2006  Weihrauch et al.
2006/0158056 A1  7/2006  Weihrauch et al.

FOREIGN PATENT DOCUMENTS

| JP | 3124238 | 5/1991 |
| --- | --- | --- |
| JP | 9233750 | 9/1997 |
| JP | 9-308195 | 11/1997 |
| JP | 11355985 | 12/1999 |
| JP | 2000004550 | 1/2000 |
| JP | 2000-232760 * | 8/2000 |
| JP | 2001268829 | 9/2001 |
| JP | 2001346368 | 12/2001 |
| JP | 2003102151 | 4/2003 |
| JP | 2003209941 | 7/2003 |
| JP | 2003-235189 | 8/2003 |
| JP | 2004-129369 | 4/2004 |
| JP | 2004364349 | 12/2004 |

* cited by examiner

ROTOR FOR AN ELECTRICAL MOTOR

CROSS-REFERENCE TO RELATED APPLICATIONS

Applicant hereby claims foreign priority benefits under U.S.C. § 119 from Danish Patent Application No. PA 2004 01957 filed on Dec. 20, 2004, the contents of which are incorporated by reference herein.

FIELD OF THE INVENTION

The invention relates to a rotor for an electrical motor, e.g. a line-start motor. The rotor has a core made of a magnetically conductive material and a squirrel cage which is moulded in contact with the core. The squirrel cage comprises axially extending conductors and axially oppositely located short circuit rings moulded from an electrically conductive material. The core comprises, in an axial end face, an opening into a cavity in which a magnet is located. To secure the magnet in the cavity, the rotor comprises an end plate which at least partly covers the end face. The end plate is attached to the core by rivet means.

BACKGROUND OF THE INVENTION

In one type of commonly used electrical motors, a stator comprises windings in which an electrical field creates a rotating magnetic field. Inside, or circumferentially outside the stator, a rotor is rotationally attached to rotate under influence of the magnetic field. Various principles exist. In a synchronous motor, the rotor is magnetised, or comprises a set of permanent magnets. This type of motor is simple and reliable, and the rotational speed of the rotor corresponds to the rotational speed of the electrical field in the windings of the stator. In certain applications, however, the synchronous motor has an inappropriate start-up characteristic. In asynchronous motors, the rotor comprises substantially longitudinally extending windings which in axially opposite ends of the rotor are interconnected by short circuit rings. Typically, a rotor for an asynchronous motor comprises a rotor core made from a magnetically conductive material and a squirrel cage wherein the windings and short circuit rings are moulded in one piece from an electrically conductive material, e.g. aluminium. The rotor could be laminated from sheets of a metal, wherein each sheet comprises an opening which, in combination with other sheets, form conductor slots extending axially throughout the rotor. After the assembly of the sheets into a rotor core, conductive bars, constituting the windings, are moulded directly into the conductor slots using the slots as a mould, and the short circuit rings are moulded as an integral part of the bars. In use, an electrical current is induced into the windings of the rotor by the magnetic field generated in the stator, and due to a shift between the electrical field in the windings of the stator and in the windings of the rotor, the rotor starts to rotate. Such motors have good start-up characteristics but in order to continue the induction of an electrical field into the windings of the rotor, the electrical field of the stator must move relative to the windings of the rotor. The rotational speed of the rotor will therefore always be lower than the rotational speed of the electrical field in the stator. To increase the speed of the rotor, a rotor for a line-start motor comprises, in addition to the windings, a set of permanent magnets, and a line-start motor thereby combines the advantages of synchronous and asynchronous motors.

In manufacturing of line-start motors, the fixation of permanent magnets in the rotor core is a sensitive process. Since an increased temperature during moulding of the squirrel cage may influence, or even destroy the permanent magnets, it is desired to insert the magnets into the core after the moulding of the squirrel cage. Therefore, the core is typically made with cavities for the magnets and with openings in an end face of the rotor. The openings are large enough to allow the magnets to be inserted into the cavities after the moulding process. When the magnets are inserted into the cavities, they must be solidly fixed to avoid displacement during rotation of the rotor. For that purpose, some rotors comprise terminating end plates which close the openings or at least reduce the size of the openings to prevent the magnets from falling out of the cavities. In the heretofore known motors, the end plate is joined e.g. by a traditional rivet or nail which extends through an opening in the endplate and down into the core of the rotor wherein the rivet is anchored. In any case, the riveting of the end plate increases the complexity and costs of the manufacturing of the rotor.

BRIEF SUMMARY OF THE INVENTION

It is an object of the invention to simplify the manufacturing process. In accordance with this object, the invention provides a rotor of the kind which is described in the introduction, in which the rivet means forms part of at least one of the short circuit rings. Due to the reduction of the number of components in the construction, a simpler design and potentially a cheaper and more reliable motor is facilitated.

The core could be made from plates of a magnetically conductive material, e.g. an iron containing material. The plates could be made and assembled in an interlocking process. The cavity for the magnet could be formed by holes in each of the plates. When the plates are stacked, the holes form substantially axially extending slots in which the magnets could be located. The cavity could have a shape which exactly matches the shape of the magnet to narrowly enclose the magnet. Preferably, the magnet and the cavity have rectangular cross sectional shapes, and preferably the cavities extend through the rotor core from a first axial end face to an opposite second axial end face with a uniform cross-sectional size and shape. In addition to, and in a corresponding manner, conductor slots may be formed in the periphery of the rotor in the stacked rotor structure, in which slots the windings of the squirrel cage can be moulded.

The rivet means forms an integrated part of at least one of the short circuit rings and forms a circumferentially extending protrusion of the end face of the rotor. The protrusion may have a shape which matches the shape of the end plate so that the protrusion encircles the end plate when the end plate is positioned on an axial end faces of the core. To fasten the end plate to the end face, the protrusion is deformed, e.g. by use of an embossing tool which is pressed against the protrusion. The Protrusion may e.g. be an annular protrusion. And in order to avoid rotational indexation of the rotor to position an indentation correctly in relation to the protrusion for deforming the protrusion, the annular protrusion may be circular in a cross section perpendicular to the rotational axis of the rotor. In a radial cross section, the protrusion may be triangular so that the protrusion terminates axially outwardly with a relatively sharp tip which facilitates deformation.

The squirrel cage is made e.g. by arranging the core in a mould of an injection moulding machine in which an electrically conductive material is injected to form not only the substantially longitudinally extending conductors but also the two axially oppositely located short circuit rings and the rivet means in one piece. The squirrel cage can preferably be moulded from aluminium or from an aluminium containing alloy which is electrically conductive and which is preferably soft relative to the magnetically conductive material so that the rivet means is relatively easily deformed when the end plates are attached.

To lock one end of the cavity for the magnet, an end plate of a first type could be made and attached to a first axial end face of the core during the interlocking process in which the core is made. Subsequently, the squirrel cage could be moulded directly into the slots for the conductors in the core thereby leaving an opening in the second axial end face for insertion of the magnets into the cavity for the magnet after the moulding of the squirrel cage. In that way, the magnets can be protected from the high temperatures generated by the moulding process. Finally, an end plate of a second type may be attached to the second axial face for securing the magnets in the magnet cavities. The end plate of the second type is fastened to the core by deformation of the rivet means so that a part of the rivet means covers the end plate. The end plates of the first and/or the second type is preferably made from a magnetically conductive material, and preferably from the same material as the plates constituting the rotor core. The end plates are provided with apertures with a cross-section at least of the size, or larger than the cross-section of the cavity, or at least of the size, or larger than the cross-section of the opening in the end face into the cavity. The shape of the apertures may, however, be different from the shape of the opening in the end face, or the aperture may be offset with respect to its position over the opening such that a major portion of the opening into the cavity is in communication with the aperture and such that a remaining, minor, portion of the cavity is covered by the end plate to secure the magnet in the cavity. A major portion could be more than 50 pct. such as more than 75 pct. or even such as more than 95 pct. or more than 99 pct. of the cross-sectional area of the aperture is in communication with the opening into the cavity. Preferably, the rotor comprises a plurality of magnets, e.g. arranged symmetrically around a radially extending axis of symmetry, e.g. the axis of rotation of the rotor in the motor. In one embodiment, the aperture is arched, or forms part of a circle extending symmetrically around the centre axis. As an example, a circular aperture could be split into a number of segments separated by bridging portions. In this embodiment, one of the magnets could be secured in the cavity by the inner peripheral edge, and an adjacent magnet could be secured in the cavity by the outer peripheral edge.

To enable repeated attachment and detachment of the end plate to the rotor core, the end plate may have a peripheral rim with a first rim portion and a second rim portion forming different radial distances to the centre axis. In that way, the end plate could be attached to the end face of the rotor core, e.g. by riveting along the edge, and if the end plate has to be removed, e.g. for replacement of the magnets, the end plate could rotated so that the already existing riveting points do not interfere with the rim portion with the largest radial size of the end plate.

In a second aspect, the invention provides a method of attaching an end plate to an end face of a rotor, the rotor comprising:

a core made of a magnetically conductive material,
a squirrel cage comprising axially extending conductors and axially oppositely located short circuit rings,
a magnet located in a cavity in the core, the cavity comprising an opening in an axial end face of the rotor, the opening forming a first edge and allowing insertion of the magnet into the cavity, the magnet being secured in the cavity by the end plate, and
rivet means forming part of the squirrel cage, characterised in that the rivet means is deformed to cover a part of the end plate.

The method may comprise any steps necessary to provide a rotor of the kind described in relation to the first aspect of the invention.

BRIEF DESCRIPTION OF THE DRAWINGS

In the following, a preferred embodiment of the invention will be described in further details with reference to the drawing in which.

DETAILED DESCRIPTION OF THE INVENTION

Figure 1:
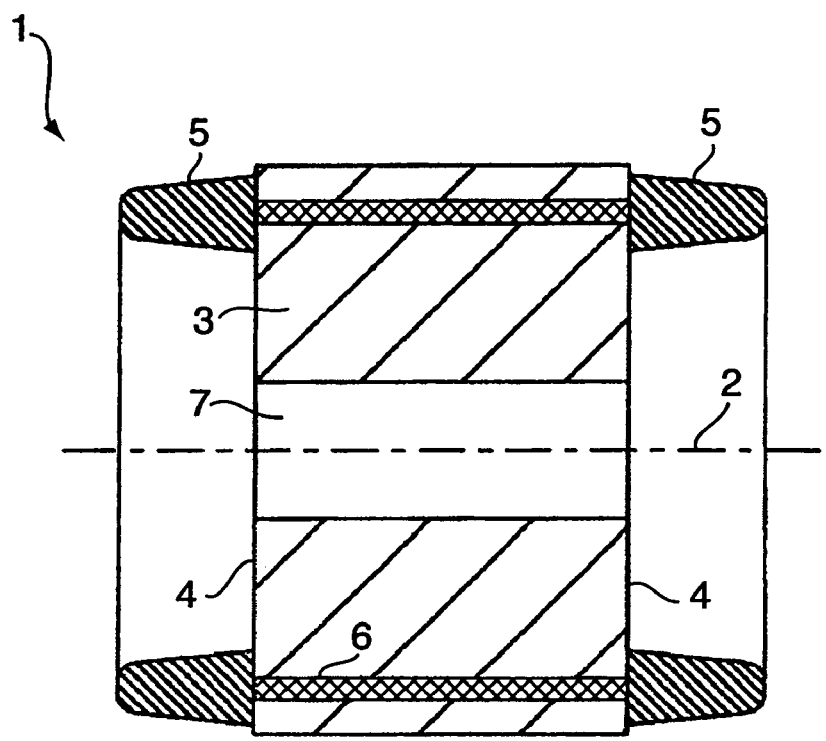
FIG. 1 shows a rotor according to the invention.

FIG. 1 shows a rotor 1 which is carried in a stator for rotation around the centre axis 2. The rotor comprises a rotor core 3 with first and second axially opposite end-faces 4. The rotor further comprises first and second axially opposite short circuit rings 5 which join the axially extending windings 6. The rotor is assembled with a drive shaft (not shown) which extends through the opening 7 and which is suspended in rotational bearings to enable rotation of the rotor relative to a corresponding stator (not shown). The rotor is made from sheets of a metal which is stacked to form a laminated core. Each sheet comprises an opening which, in combination with other sheets, forms conductor slots extending axially throughout the rotor. After the assembly of the sheets into a rotor core, conductive bars, constituting the windings, are moulded directly into the conductor slots using the slots as a mould, and the short circuit rings are moulded as an integral part of the bars. To increase the speed of the rotor, 6 permanent magnets are inserted into axially extending slots.

Figure 2:
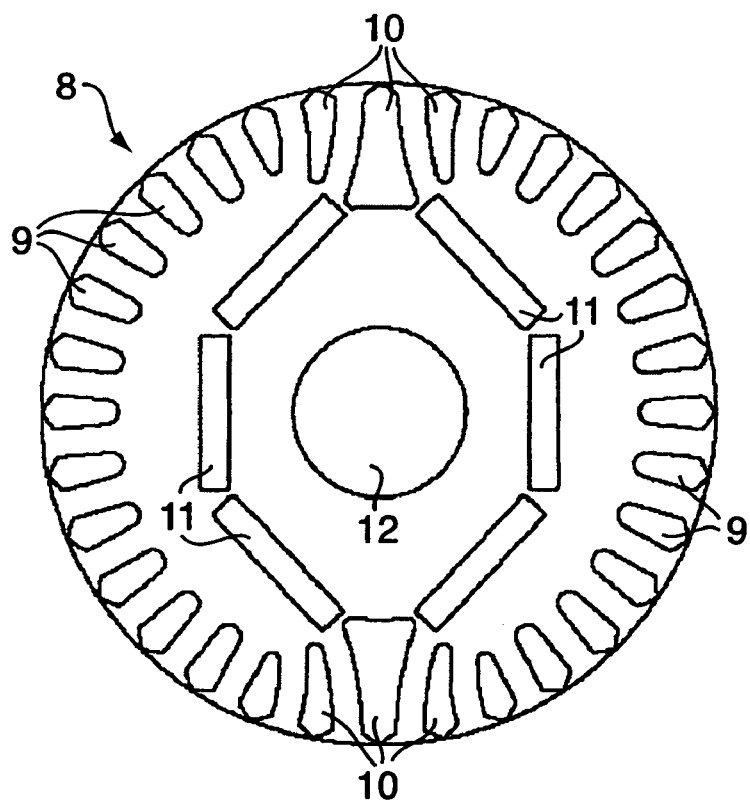
FIG. 2 shows a view of a plate for a rotor stack.

FIG. 2 shows a top view of one type of the metal sheets 8 in the rotor stack in which the openings 9 form part of the conductor slots when a plurality of sheets are stacked to form the laminated rotor structure. At two radially opposite locations, the conductor slots 10 are longer and wider to form a barrier for the magnetic flux. In the assembled state, the rectangular openings 11 form cavities for permanent magnets which are inserted into openings in one of the two axially opposite end-faces of the rotor to form a line start motor. The centre-opening 12 forms part of the axially extending opening through the rotor for the drive shaft.

Figure 3:
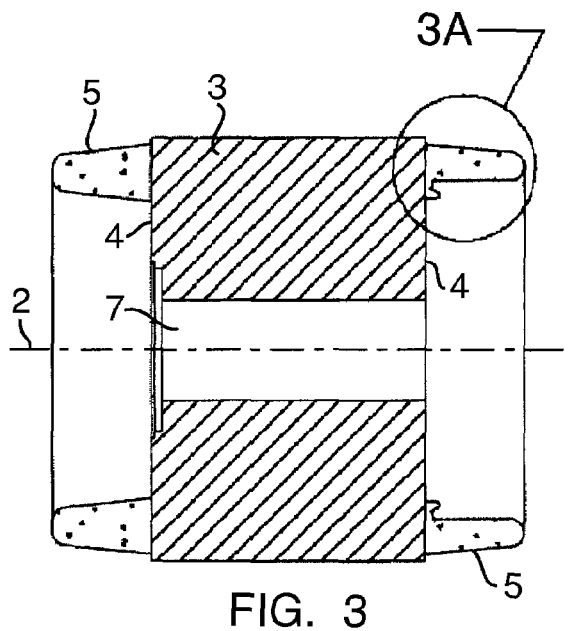
FIG. 3 shows an enlarged view of the rivet means which forms part of a short circuit ring.
Figure 3A:
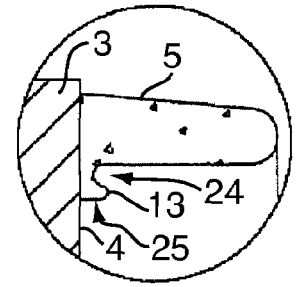
Figure 4:
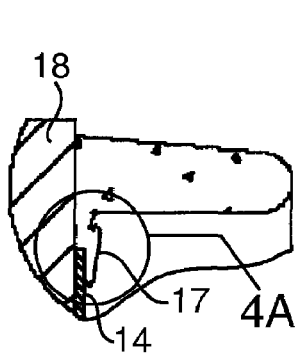
FIGS. 4 and 5 show enlarged views of the rivet means after deformation.
Figure 4A:
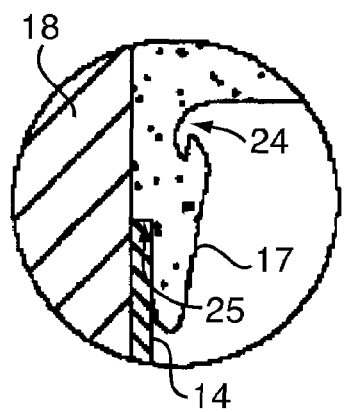
Figure 5:
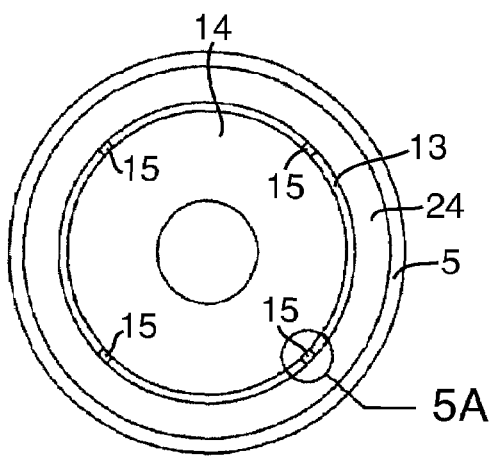
Figure 5A:
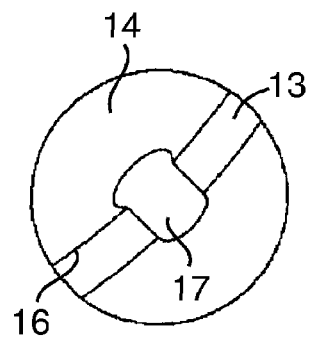

FIG. 3 shows an enlarged view of a rivet means 13 forming part of one of the short circuit rings 5. The disclosed rivet means forms a circular, circumferentially extending inner annular protrusion of the end face, while the one of the circuit rings 5 forms an outer annular protrusion of the end face. The rivet means 13 and the one of the short circuit rings 5 define between them a circumferential trough 24 separating the inner annular protrusion from the outer annular protrusion. FIGS. 4, 4a, 5, and 5a show sectional and elevation views wherein an end plate 14 is positioned on an axial end face of the rotor and wherein the inner annular protrusion, at four selected spots 15, is deformed to cover a peripheral rim portion 16 of the end plate to fasten the end plate to the core. In the enlarged views 4a and 5a, it is clearly seen how the deformed spot 17 fastens the end plate 14 to the core 18. The inner annular protrusion has a substantially circular radially inward surface 25 that encircles the periphery of the end plate closely.

Figure 6:
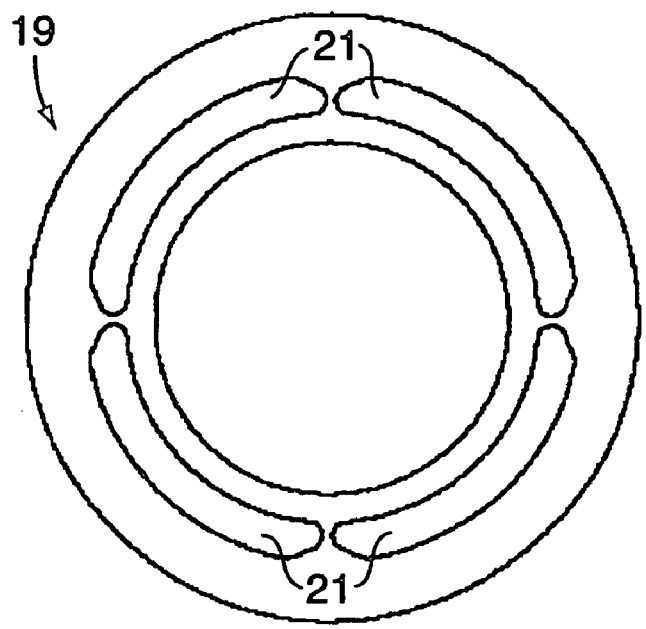
FIGS. 6 and 7 show different embodiments of end plates for the rotor.
Figure 7:
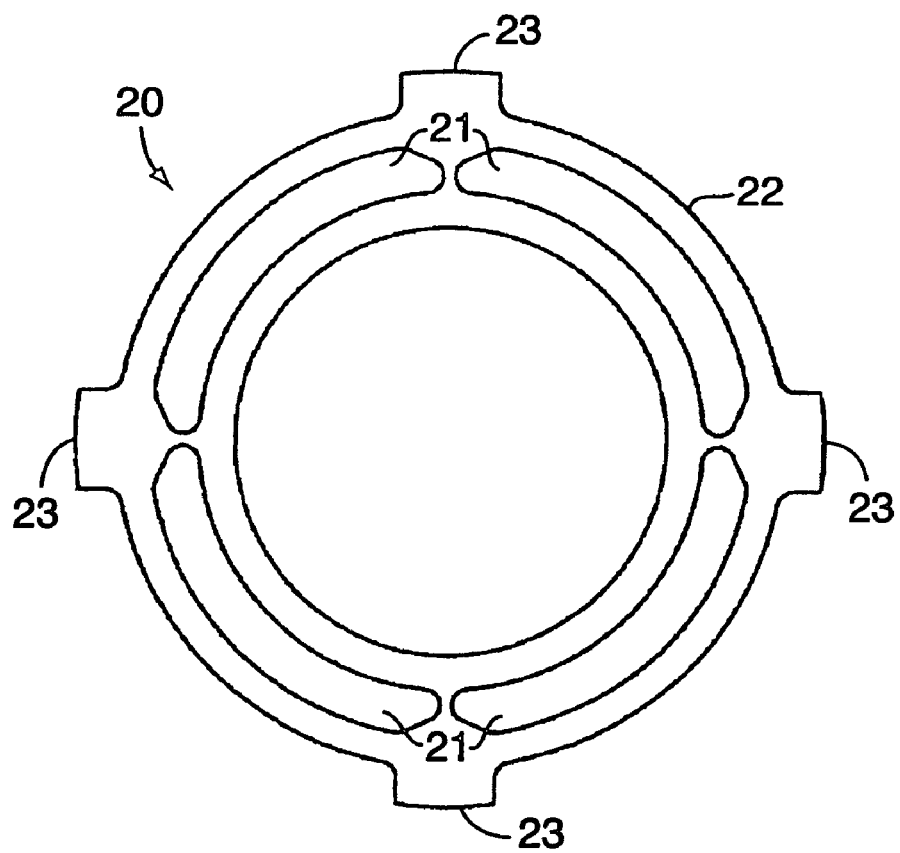

FIGS. 6 and 7 show two different embodiments of an end plate 19, 20. The end plate is attached to an axial end face of the rotor stack and thereby terminates that end of the rotor stack and secures the magnets in the cavities. To keep the manufacturing costs as low as possible, the end plate is made from the same material as other plates of the rotor stack, namely a magnetically conductive material. In order not to short-circuit the magnets, openings 21 are located in communication with the openings into the cavities for the magnets. In order to secure the magnets in the cavities, the openings in the end plates are non-congruent with respect to the openings into the magnet cavities. The rotor is provided with 6 rectangular openings into the cavities for the magnets, and the end plate is provided with 4 arc-shaped openings which are symmetrically located around the centre of the end plate. The advantage of this shape is that the end plate can be attached arbitrarily to the rotor stack without considering indexation to position the openings of the end plate relative to the openings into the magnet cavities.

During manufacturing, the rotor core is made in an interlocking process wherein a number of plates are stacked to form a main part of the rotor core. In one end, the opening into the cavities for the magnets is limited to secure the magnets from falling out of the cavities through this end. The openings could be limited e.g. by attaching an end plate to the rotor core. After the moulding process, i.e. when the work piece has cooled down, the magnets are inserted into the magnet cavities through the end face which is not fitted with an end plate, and one of the plates 19, 20 is fitted to that end face thereby to secure the magnets in the cavities. The end plate is fastened to the rotor stack by deformation of the rivet means.

FIG. 7 shows an end plate 20 with a peripheral rim with a first rim portion 22 and a second rim portion 23 forming different radial distances to the centre of the end plate. The end plate facilitates refitting, e.g. in connection with replacement of the magnets. If the end plate has to be removed, the part of deformed spots of the rivet means which covers the end plate is removed. Subsequently, the end plate can be refitted to the core by rotating it in relation to the previous location so that the rim portion 22 is located at the already deformed spots while new deformations are formed to cover the end plate at the rim portions 23.

While the present invention has been illustrated and described with respect to a particular embodiment thereof, it should be appreciated by those of ordinary skill in the art that various modifications to this invention may be made without departing from the spirit and scope of the present invention.

The invention claimed is:

1. A rotor for an electrical motor, the rotor comprising:
a core made of a magnetically conductive material, the core extending in an axial direction between substantially opposed first and second axial end faces, the core having a plurality of axially extending magnet cavities and conductor slots formed therein, at least the first axial end face having a plurality of magnet cavity openings formed therein, the magnet cavity openings permitting insertion of permanent magnets into the magnet cavities;
a plurality of permanent magnets arranged in the magnet cavities;
an end plate at least partially covering the first axial end face, the end plate securing the permanent magnets in the magnet cavities; and
a squirrel cage including a plurality of conductors arranged in the conductor slots and first and second short circuit rings arranged on respective first and second axial end faces, the first short circuit ring including
a substantially circumferential protrusion located radially inward of a remainder of the short circuit ring, the circumferential protrusion protruding axially away from the first axial end face,
wherein at least a portion of the circumferential protrusion is deformed to define at least one deformed portion holding the end plate to the first axial end face, and wherein the at least one deformed portion can be formed at any point of the circumferential protrusion.

2. The rotor according to amended claim 1, wherein the protrusion is triangular in a radial cross sectional view.

3. The rotor according to amended claim 1, wherein the protrusion extends axially in the range of $1/10$ to $1/20$ of a distance which the remainder of the short circuit ring extends in the axial direction.

4. The rotor according to amended claim 1, wherein the protrusion extends radially in the range of $1/5$ to $1/10$ of a distance which the remainder of the short circuit ring extends radially.

5. The rotor of amended claim 1, wherein the protrusion is substantially circular.

6. The rotor of amended claim 1, wherein the conductors are molded in the conductor slots and the short circuit rings are molded integrally with the conductors.

7. A rotor for an electrical motor, the rotor comprising:
a core extending in an axial direction between substantially opposed first and second axial end faces, and having conductor slots formed therein, the conductor slots extending from the first axial end face to the second axial end face;
an end plate at least partially covering the first axial end face; and
a squirrel cage including a plurality of conductors arranged in the conductor slots and first and second short circuit rings arranged on respective first and second axial end faces, the first short circuit ring including inner and outer annular protrusions extending axially away from the first axial end face of the core, the inner and outer annular protrusions being separated by a circumferential trough, and the inner protrusion including at least one deformed portion, the at least one deformed portion holding the end plate to the first axial end face of the core.

8. A rotor for an electrical motor, the rotor comprising:
a core extending in an axial direction between substantially opposed first and second axial end faces and having a plurality of axially extending conductor slots formed therein;
an end plate at least partially covering the first axial end face; and
a squirrel cage including a plurality of conductors arranged in the conductor slots and including first and second short circuit rings arranged on respective first and second axial end faces, at least the first short circuit ring including at least one deformed portion holding the end plate to the first axial end face and having a substantially circular inward surface, such that the deformed portion can be formed at any point around the inward surface.

* * * * *